(12) United States Patent
Jayadeva et al.

(10) Patent No.: US 11,795,037 B2
(45) Date of Patent: Oct. 24, 2023

(54) OVERHEAD TRAVELLING CRANE ASSEMBLY

(71) Applicant: Siemens Gamesa Renewable Energy A/S, Brande (DK)

(72) Inventors: Bharath Jayadeva, Karnataka (IN); Mithilesh Kumar, Karnataka (IN)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 226 days.

(21) Appl. No.: 17/433,321

(22) PCT Filed: Mar. 2, 2020

(86) PCT No.: PCT/EP2020/055442
§ 371 (c)(1),
(2) Date: Aug. 24, 2021

(87) PCT Pub. No.: WO2020/178239
PCT Pub. Date: Sep. 10, 2020

(65) Prior Publication Data
US 2022/0153560 A1 May 19, 2022

(30) Foreign Application Priority Data
Mar. 4, 2019 (EP) .................................... 19160602

(51) Int. Cl.
*B66C 7/02* (2006.01)
*B66C 19/00* (2006.01)
(Continued)

(52) U.S. Cl.
CPC ............... *B66C 19/00* (2013.01); *B66C 7/16* (2013.01); *B66C 9/18* (2013.01); *F03D 13/10* (2016.05); *F03D 13/20* (2016.05); *F05B 2230/61* (2013.01)

(58) Field of Classification Search
CPC ............................... B66C 19/00; F03D 13/20
See application file for complete search history.

(56) References Cited

U.S. PATENT DOCUMENTS

| 3,017,958 A | 1/1962 | Richter |
| 7,735,808 B2 | 6/2010 | Ecotecnia |
| (Continued) | | |

FOREIGN PATENT DOCUMENTS

| JP | S48 100843 A | 12/1973 |
| KR | 2014 0096436 A | 8/2014 |

OTHER PUBLICATIONS

PCT International Search Report dated Jun. 15, 2020 corresponding to PCT International Application No. PCT/EP2020/055442.
(Continued)

*Primary Examiner* — Long T Tran
(74) *Attorney, Agent, or Firm* — Schmeiser, Olsen & Watts LLP

(57) ABSTRACT

Provided is an overhead travelling crane assembly including an overhead rail and a hoist unit realized to travel along the rail, characterized by a parking lock mounted to the hoist unit, which parking lock includes a brake assembly which, in its default position, prevents movement of the hoist unit along the overhead rail; and a release means realized to release the brake assembly to allow movement of the hoist unit along the overhead rail. Also provided is a method of operating such an overhead travelling crane assembly; and a wind turbine including such an overhead travelling crane assembly in the nacelle.

14 Claims, 4 Drawing Sheets

(51) Int. Cl.
      *F03D 13/20*     (2016.01)
      *F03D 13/10*     (2016.01)
      *B66C 7/16*       (2006.01)
      *B66C 9/18*       (2006.01)

(56) References Cited

U.S. PATENT DOCUMENTS

| | | | | |
|---|---|---|---|---|
| 2008/0245756 | A1* | 10/2008 | Dehlsen | B66C 23/207 |
| | | | | 212/224 |
| 2009/0202350 | A1* | 8/2009 | Pedersen | F03D 13/10 |
| | | | | 29/889.1 |
| 2011/0135478 | A1* | 6/2011 | Kappel | B66C 17/00 |
| | | | | 212/312 |
| 2012/0126542 | A1* | 5/2012 | Deng | F03D 3/005 |
| | | | | 290/55 |
| 2012/0141280 | A1* | 6/2012 | Holling | F03D 80/50 |
| | | | | 29/889 |
| 2015/0252777 | A1* | 9/2015 | Rhinefrank | F03B 13/20 |
| | | | | 290/53 |
| 2015/0300037 | A1* | 10/2015 | Pellerin | E04H 12/085 |
| | | | | 212/199 |
| 2022/0041409 | A1* | 2/2022 | Hooftman | F16B 2/06 |

OTHER PUBLICATIONS

PCT Written Opinion dated Jun. 15, 2020 corresponding to PCT International Application No. PCT/EP2020/055442.

* cited by examiner a filing date of Mar. 4, 2019, the entire contents both of
OVERHEAD TRAVELLING CRANE ASSEMBLY

CROSS-REFERENCE TO RELATED APPLICATIONS

This application claims priority to PCT Application No. PCT/EP2020/055442, having a filing date of Mar. 2, 2020, which is based on EP Application No. 19160602.9, having a filing date of Mar. 4, 2019, the entire contents both of which are hereby incorporated by reference.

FIELD OF TECHNOLOGY

The following relates to an overhead travelling crane assembly; a method of operating an overhead travelling crane assembly; and a wind turbine.

BACKGROUND

In the assembly of a wind turbine, or during maintenance and repair routines, it may be necessary to transfer heavy components between the top of the wind turbine (e.g. inside the nacelle or canopy) and the bottom of the wind turbine (e.g. at foundation level or the base of the tower). Usually, some kind of service crane is installed in the nacelle or canopy to assist in such maneuvers. One type of service crane has an extendable boom and can reach from inside the nacelle through a hatch in the roof to the outside, and can raise and lower a load by a winch. This type of crane is generally positioned closer to the hub end of the nacelle so that it can be used to reach loads delivered to a helipad on the nacelle roof. However, such a crane assembly is constrained by the presence of the bedframe and rotor shaft extending across the opening at the top of the tower. Furthermore, it may be difficult to use such a crane to lift loads from the base of the wind turbine, since the range of motion of the crane is limited by its mounting fixture and by the hatches in the nacelle roof or sides.

An alternative approach may be to mount an overhead rail system to the "ceiling" of the nacelle, and to provide a hoist unit that can freely travel along the overhead rail. The hoist unit can be brought into position near a hatch when needed, for example over a floor hatch at the rear of the nacelle, and then moved out of the way when no longer needed.

An overhead travelling crane such as disclosed in U.S. Pat. No. 3,017,958 and KR20140096436 is known from the conventional art in manufacturing environments, steel mills, container transfer stations, warehouses, etc. A motorized and remote-controlled hoist unit can be made to travel back and forth along a horizontal overhead rail as required. In such applications, the overhead rail is always horizontal. To ensure that the hoist unit only moves within predefined outer limits along the overhead rail, clamps are secured at the relevant positions.

When such an overhead travelling crane is used in a wind turbine nacelle as explained above, the free movement of the hoist unit may be a problem. For example, maneuvers within the confined space of the nacelle may result in the hoist unit being inadvertently pushed away from its working location. Any load suspended from the hoist may start to swing as a result, and may collide with the tower wall. When a load is being lifted or raised between the nacelle and the base of the tower, a gust of wind may cause the load to swing, and the hoist unit may shift along the overhead rail as a result. Furthermore, any yaw correction (to turn the aerodynamic rotor into the wind) results in movement of the entire nacelle. This may cause the hoist unit to slide along the rail.

One way of dealing with these problems is to provide a detachable clamp unit that can be mounted on to the overhead rail as required, i.e. beside a working position of the hoist unit, so that the hoist unit cannot move from that working position until the clamp unit is removed. However, the need to manually attach and remove the clamp unit adds significantly to the time required to carry out a lifting procedure. Furthermore, any manual operations that are performed near the open tower top are also regarded as hazardous and additional safety measures must be complied with to prevent accidents. Such measures also add to the cost of the lifting procedure.

SUMMARY

An aspect relates to an improved overhead travelling crane assembly that overcomes the problems outlined above.

According to embodiments of the invention, the overhead travelling crane assembly comprises an overhead rail and a hoist unit realized to travel along the rail, and a parking lock that is mounted to the hoist unit, so that the hoist unit and the parking lock can be regarded as a single entity. The parking lock comprises a brake assembly which, in its default position, prevents movement of the hoist unit along the overhead rail; and a release means realized to release the brake assembly to allow movement of the hoist unit along the overhead rail. The overhead travelling crane is characterized in that the brake assembly comprises a pair of pivot arms arranged to rotate in opposite directions about a pivot point, and the release means (120) comprises a pull-strap suspended from the lower ends of the pivot arms to rotate the pivot arms outward about the pivot point.

The brake assembly may be regarded as "passive" because, in its default position, it prevents movement of the hoist unit along the overhead rail. In the same way, the release means may be regarded as "active", since it must be deliberately actuated to release the brake assembly.

An advantage of the overhead travelling crane assembly according to embodiments of the invention is that there is no need to manually affix a separate clamp unit to the overhead rail. Instead, the parking lock is mounted to the hoist unit, so that at any position of the hoist unit, the parking lock is already available.

According to embodiments of the invention, the method of operating such an overhead travelling crane assembly comprises the steps of opening the parking lock by pulling on the pull-strap; moving the hoist unit to another location along the overhead rail by exerting a traction force on the pull-strap; and closing the parking lock by reducing the traction force on the pull-strap.

An advantage of the inventive method is that the hoist unit can quickly and easily be moved from one position on the overhead rail to a different position, without the need for detaching and re-attaching a separate clamp unit. This ease of handling of the hoist unit can reduce the overall time needed for a lifting maneuver. When installed in a confined space such as a wind turbine nacelle, the inventive method can also favorably reduce the hazard level for a technician.

According to embodiments of the invention, the wind turbine comprises a nacelle mounted on top of a tower, and an embodiment of the inventive overhead travelling crane assembly installed in the nacelle.

Additional embodiments and features of the invention are given by the dependent claims, as revealed in the following description. Features of different claim categories may be combined as appropriate to give further embodiments not described herein.

Embodiments of the inventive overhead travelling crane assembly can be installed in any appropriate environment, for example in a manufacturing plant to assist in the assembly of large components. In the following, without restricting embodiments of the invention in any way, it may be assumed that the overhead travelling crane assembly is installed in the nacelle of a wind turbine, and that the purpose of the hoist unit is to transfer loads between the nacelle of a wind turbine and the base of the wind turbine, for example from foundation level, or from the level of a transition piece in the case of an offshore turbine.

Usually, a hoist unit realized for use on such an overhead travelling crane will comprise a winch (a cable coiled around a drum or spool) and a drive unit realized to operate the winch in order to raise or lower a load. In an embodiment, when installed in a nacelle, the hoist unit of the overhead travelling crane is realized to transfer a load between the nacelle and the base of the wind turbine, i.e. to lift a generator component, a yaw drive, machinery or tools etc. A nacelle may be constructed to have one or more suitably placed openings or hatches, for example a hinged floor section. With a suitably positioned overhead rail, the hoist unit can be used to transfer a load that is too large to pass through the upper level of the tower.

According to embodiments of the invention, the release means is manually operated. Apart from being very economical to realize, the advantage of a manual release means is that an unintentional actuation is highly unlikely. It is therefore highly unlikely that the parking lock will be inadvertently opened.

The brake assembly comprises at least one pivot arm arranged to rotate about a pivot point, and realized so that, in its default state, the pivot arm is oriented to that one end is pressed against a surface of the overhead rail. To this end, in an embodiment of the invention, the brake assembly is spring-loaded, and the release means must be actuated to overcome the spring force in order to release the brake assembly.

In one possible embodiment, the brake assembly might be realized as an assembly similar to a side-pull caliper brake, with one essentially stationary arm, a pivot point, and one pivot arm arranged to rotate about the pivot point. However, according to embodiments of the invention, the brake assembly is realized as an assembly that is similar to a center-pull caliper brake. In such an embodiment, the brake assembly comprises a pivot point and a symmetrical arrangement of two pivot arms that rotate in opposite directions about the pivot point.

In an embodiment of the invention, one end of a pivot arm terminates in a brake pad arranged to press against a surface of the overhead rail. A brake pad can be made of a suitably high-friction material such as polyurethane rubber. The spring force of the spring-loaded pivot arms, augmented by the brake pad friction, may be sufficient to hold the hoist unit in place during most lifting maneuvers. However, when a load is being lifted from the base of the tower, a sudden gust of wind can result in a jerking movement of the winch, which may shift the hoist unit along the rail. Therefore, in an embodiment of the invention, the overhead travelling crane assembly makes use of a safety pin to hold the brake assembly against the overhead rail. To this end, at least one pair of through-holes is formed on opposite sides of the overhead rail, and the brake assembly further comprises a pin shaped to extend through the through-holes. After positioning the hoist unit at a desired position along the overhead rail, the safety pin is inserted through the holes to fix the position of the hoist unit. The lifting maneuver can then be carried out.

In an embodiment, the release means is realized to rotate a pivot arm so that the corresponding brake pad is moved away from the overhead rail. The release means can be realized in any suitable manner. In an embodiment of the invention, the release means comprises a manually accessible strap (or cable, chain, rope etc.) suspended from the outer end of a pivot arm. By pulling on the strap, the pivot arm is rotated about the pivot point, and the other end of the pivot arm—the end that otherwise presses against the overhead rail—is moved outward, so that the brake assembly is released from its locked state, and the hoist unit can be moved along the overhead rail. In a "center-pull" realization, a strap can be attached to the lower ends of each pivot arm, and a technician can pull on both simultaneously to unlock the brake assembly. In an embodiment of the invention, such a pull-strap is suspended between the outer ends of a pair of pivot arms. In this case, the parking lock is opened by pulling on the pull-strap suspended between the outer ends of the pivot arms.

In order to move the hoist unit to another location, tension is maintained on the pull-strap to keep the pivot arms open. The pull-strap can therefore also serve as a means to pull the hoist unit along the rail. When the hoist unit has been moved to the desired position on the rail, the parking lock is closed by letting go of the pull-strap.

BRIEF DESCRIPTION

Some of the embodiments will be described in detail, with references to the following Figures, wherein like designations denote like members, wherein.

DETAILED DESCRIPTION

Figure 1:
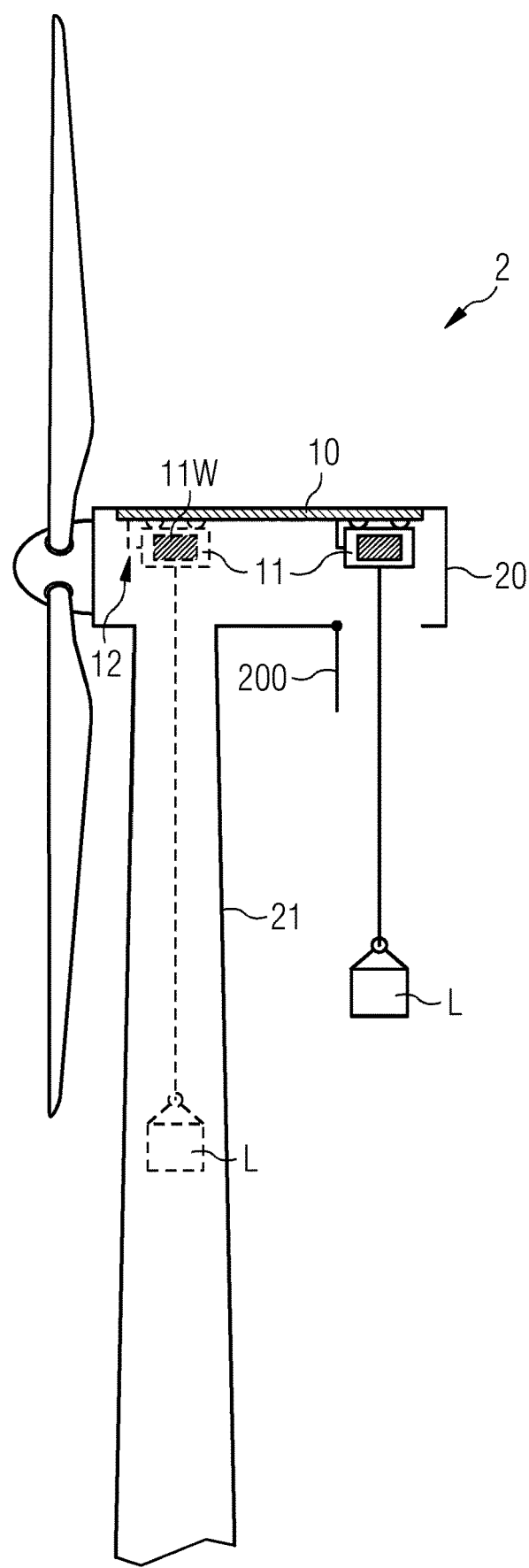
FIG. 1 shows an embodiment of the inventive overhead travelling crane assembly.

FIG. 1 shows an embodiment of the inventive overhead travelling crane assembly 1 installed in the nacelle 20 of a wind turbine 2. The crane assembly 1 comprises an overhead rail 10 mounted onto the ceiling of the nacelle, and a hoist unit 11 that can be moved to any desired position along the rail 10, for example to a position over a floor hatch 200 at the rear of the nacelle 20, or to any other position along the overhead rail 10. To prevent the hoist unit 11 from sliding along the rail 10, a parking lock 12 is mounted to the hoist unit 11, so that the hoist unit 11 can be locked at any point along the overhead rail 10. The parking lock 12 comprises a passive brake assembly which, in its default position, prevents movement of the hoist unit 11 along the overhead rail 10. A release means can be actuated by a technician in the nacelle 20 to allow movement of the hoist unit 11 along the overhead rail 10. The overhead travelling crane assembly 1 may be used for example to transfer parts, machinery or tools during installation or maintenance of a generator (not shown) or other equipment.

Figure 2:
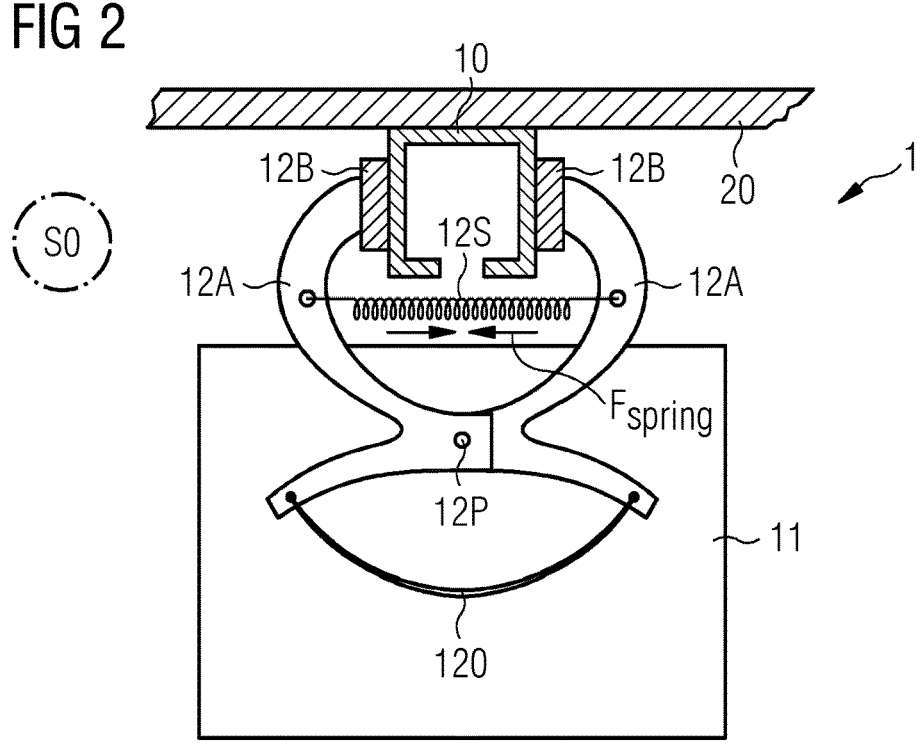
FIG. 2 shows a default state of a parking lock in an embodiment of the inventive crane assembly.

FIG. 2 shows the default state S0 of a parking lock 12 in an embodiment of the inventive overhead travelling crane assembly 1. Although not shown in the diagrams, it may be assumed that the hoist unit 11 travels along the overhead rail 10 by a set of rollers or wheels arranged on the inside of the overhead rail 10, as will be known to the skilled person. Here, the parking lock 12 is realized as a symmetrical pair of pivot arms 12A. The pivot point 12P to which the arms 12A are attached is mounted directly to the hoist unit 11. A strong spring 12S with spring force $F_{spring}$ extends horizontally between the pivot arms 12A to pull these towards each other. This ensures that brake pads 12B (one at each upper end of a pivot arm 12A) are pressed against the overhead rail 10. This state S0 will persist as long as the spring force $F_{spring}$ is not counteracted, i.e. as long as the spring force $F_{spring}$ is the largest force acting on the pivot arms 12A. The pivot arms 12A are shaped to have outer ends extending away from the pivot point P. A pull-strap 120 extends between the lower ends of the pivot arms 12A. The parking lock 12 with its pivot arms 12A and pull-strap 120 is realized in such a way that a technician in the nacelle can easily reach the pull-strap 120.

Figure 3:
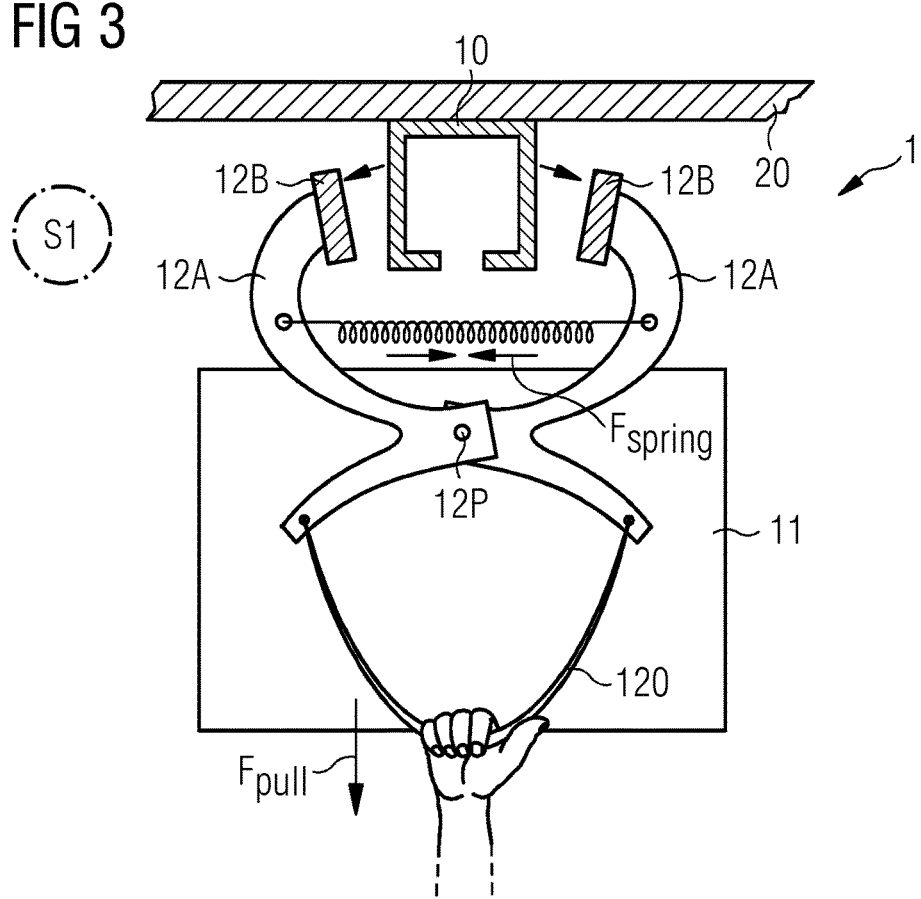
FIG. 3 shows an "open" state of the parking lock of the embodiment of FIG. 2.
Figure 4:
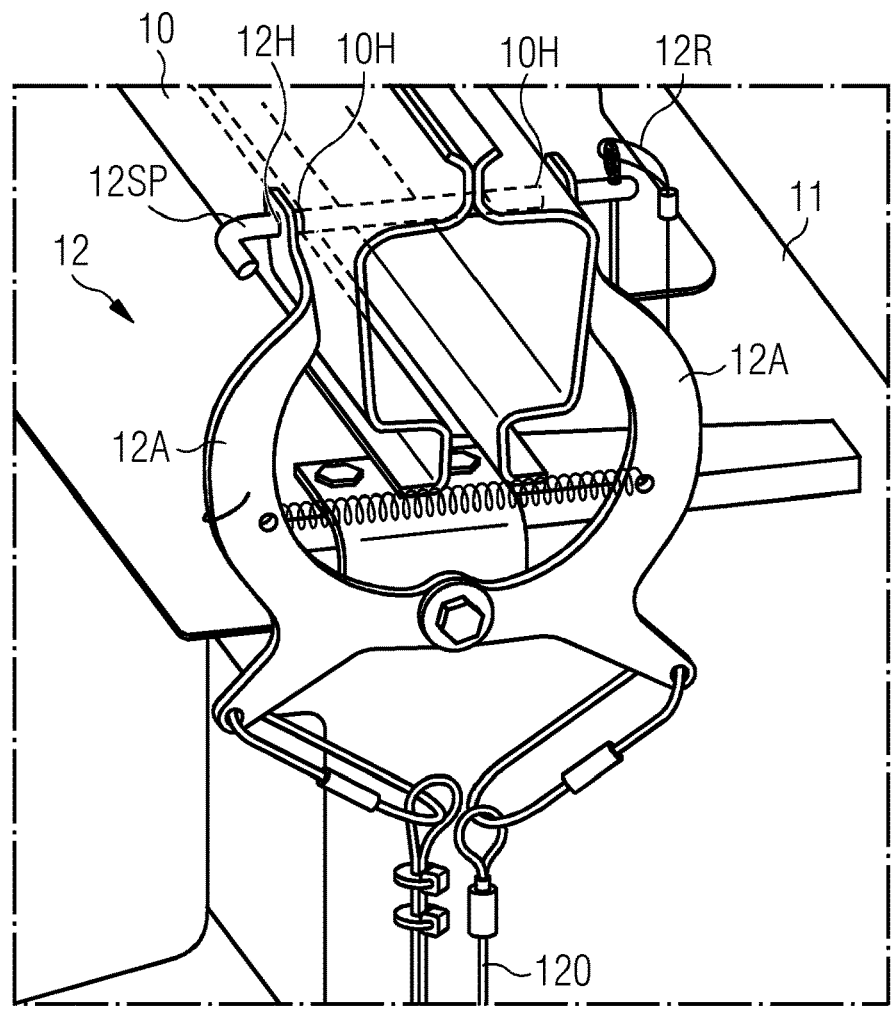
FIG. 4 shows a stage in an inventive method.

FIG. 3 shows the "open" state S1 of the parking lock 12 of FIG. 2. Here, a technician is pulling downwards on the pull-strap 120 to exert a downward traction force $F_{pull}$ on the pull-strap 120. A sufficient downward pull $F_{pull}$ will overcome the spring force $F_{spring}$ and will turn the pivot arms 12A about the pivot point 12P, thereby moving the brake pads 12B away from the overhead rail 10. The hoist unit 11 is now free to be moved along the rail 10 to any new position.

The diagram also illustrates a further safety measure that may be implemented to avoid a displacement of the hoist unit in the event of a sudden jerking motion of the winch 11W, which may happen when the winch 11W takes the full weight of the load L, or if a gust of wind causes the load to swing. In this exemplary embodiment, a safety pin 12SP is inserted through both upper ends of the pivot arms 12A, extending also through the overhead rail 10. The brake pads 12B still act to clamp the hoist unit 11 in place, but the safety pin 12SP ensures that the hoist unit 11 stays in place in the event that a sudden motion of the winch would briefly overcome the spring force $F_{spring}$ and brake pad friction. A pair of holes 10H are provided at a strategic position on the overhead rail 10, for example at a position over a hatch in the nacelle floor, since the problem of wind gusting will usually only occur when lifting a load from the outside into the nacelle. Of course, such pairs of through-holes 10H may be provided at various other points along the overhead rail 10.

The safety pin 12SP may be a separate part that is carried by a service technician, who can insert it after moving the hoist unit 11 along the overhead rail 10 to a desired position. The head of the safety pin 12SP can be bent, for example in an L-shape, to act as a stop. After insertion, in an embodiment, the safety pin 12SP is secured at least at one end to the brake assembly. The diagram shows an embodiment, in which holes 12H are also provided at upper ends of the pivot arms 12A. To use the safety pin 12SP, the hoist unit 11 is moved along the overhead rail 10 to align all four through-holes 12H, 10H, and the safety pin 12SP is then inserted from one side of the overhead rail 10 through all four through-holes 12H, 10H so that the tip of the safety pin 12SP protrudes some distance from the other side of the overhead rail 10. The diagram also shows a retainer 12R that can be inserted through the tip of the safety pin 12SP and secured to the other side of the brake assembly 12.

Figure 5:
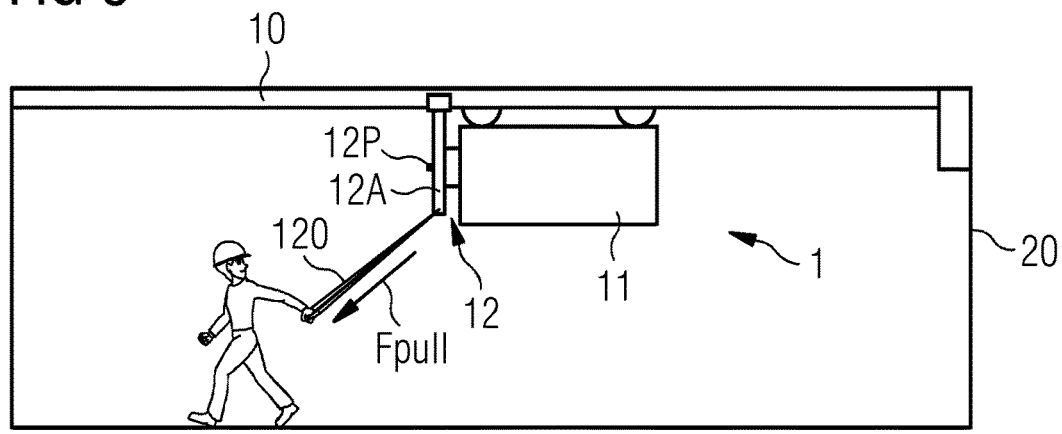
FIG. 5 illustrates an additional safety measure.

Moving the hoist unit 11 is illustrated in FIG. 5, which shows a very simplified view of a nacelle interior. A technician has exerted a downward traction force $F_{pull}$ on the pull-strap 120 of the parking lock 12 to deliberately open the parking lock 12, and maintains this traction force $F_{pull}$ by pulling on the pull-strap 120 to keep the parking lock 12 open so that the hoist unit 11 can be re-positioned along the overhead rail 10. As soon as the technician stops pulling on the pull-strap 120, the spring force $F_{spring}$ will return the pivot arms 12A to their default positions, and the brake pads 12B will once again press against the rail 10 and prevent movement of the hoist unit 11.

Figure 6:
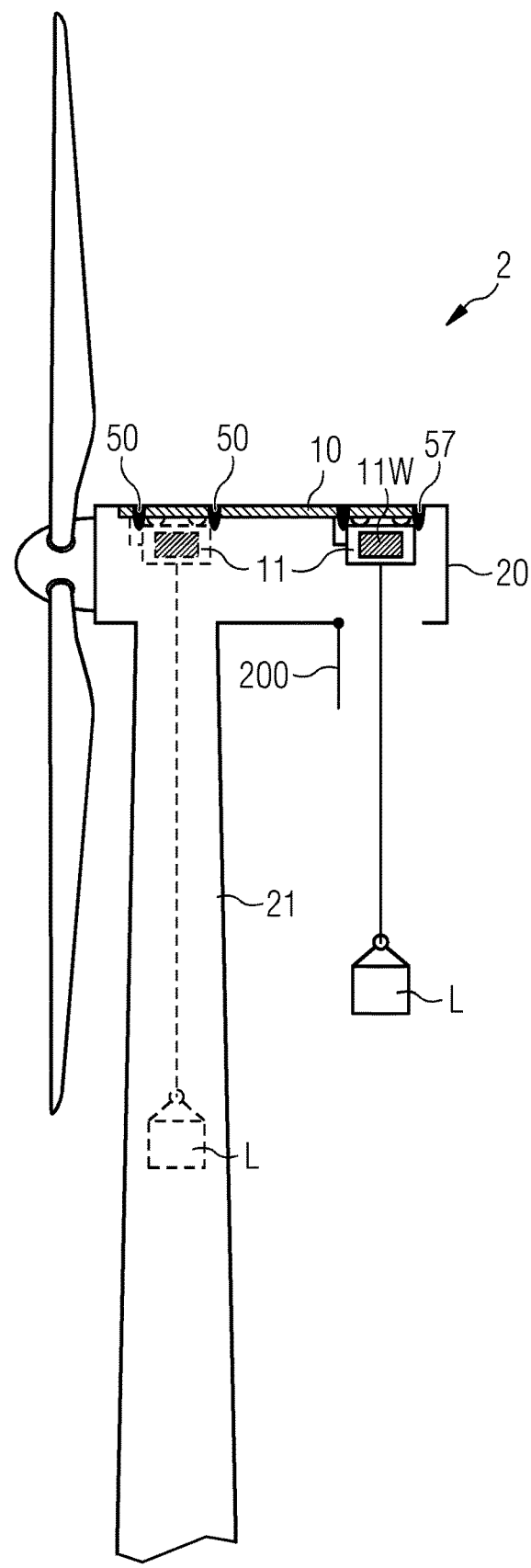
FIG. 6 shows a conventional crane assembly installed in a wind turbine.

FIG. 6 shows a conventional overhead travelling crane assembly 6 installed in the nacelle 20 of a wind turbine 2. Here also, a hoist unit 11 can be moved to a position at the rear of the nacelle 20 to lift a load from foundation level. In order to prevent the hoist unit 11 from sliding along the rail 10, a clamp 60 is attached to the rail 10 beside the working position of the hoist unit 11. It may be necessary to place a clamp on each side of the hoist unit 11. When the lifting maneuver is finished, the clamp(s) 60 are detached again and the hoist unit 11 is moved to another position, for example beside a permanent end stop or buffer 61 at the end of the rail 10. The need to provide additional clamps and the time it takes to secure them before a hoisting maneuver and to remove them again afterwards can add significantly to the costs of a lifting procedure.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An overhead travelling crane assembly comprising an overhead rail and a hoist unit configured to travel along the rail, and a parking lock mounted to the hoist unit, wherein the parking lock comprises:
   a brake assembly which, in its default position, prevents movement of the hoist unit along the overhead rail; and
   a release means configured to release the brake assembly to allow movement of the hoist unit along the overhead rail;
wherein
the brake assembly comprises a pair of pivot arms arranged to rotate in opposite directions about a pivot point; and
the release means comprises a pull-strap suspended from the lower ends of the pivot arms configured to rotate the pivot arms outward about the pivot point.

2. The overhead travelling crane assembly according to claim 1, wherein the release means is manually operated.

3. The overhead travelling crane assembly according to claim 1, wherein the brake assembly comprises a brake pad arranged to press against a surface of the overhead rail.

4. The overhead travelling crane assembly according to claim 3, wherein the brake pad is made of a high-friction material.

5. The overhead travelling crane assembly according to claim 4, wherein the brake pad is made of polyurethane rubber.

6. The overhead travelling crane assembly according to claim 1, wherein the hoist unit travels along the overhead rail by a set of rollers or wheels arranged on the inside of the overhead rail.

7. The overhead travelling crane assembly according to claim 1, wherein the brake assembly is spring-loaded.

8. The overhead travelling crane assembly according to claim 1, comprising at least one pair of through-holes formed on opposite sides of the overhead rail, and wherein the brake assembly comprises a pin shaped to extend through the through-holes.

9. A method of operating the overhead travelling crane assembly according to claim 1, comprising:
- opening the parking lock by pulling on the pull-strap;
- moving the hoist unit to another location along the overhead rail by exerting a traction force on the pull-strap; and
- closing the parking lock by reducing the traction force on the pull-strap.

10. The method according to claim 9, further comprising inserting a safety pin through holes provided at upper ends of the pivot arms and through-holes formed in the overhead rail.

11. The method according to 10, further comprising inserting a retainer through the tip of the safety pin.

12. A wind turbine comprising a nacelle mounted on top of a tower, and the overhead travelling crane assembly according claim 1 installed in the nacelle.

13. The wind turbine according to claim 12, wherein the hoist unit comprises a winch and a drive unit configured to operate the winch.

14. The wind turbine according to claim 12, wherein the overhead travelling crane assembly is configured to transfer a load between the nacelle and the base of the tower.

* * * * *